United States Patent
Agarwal et al.

(10) Patent No.: US 9,591,095 B2
(45) Date of Patent: Mar. 7, 2017

(54) PREFETCHING APPLICATION DATA FOR PERIODS OF DISCONNECTIVITY

(71) Applicant: MICROSOFT TECHNOLOGY LICENSING, LLC, Redmond, WA (US)

(72) Inventors: Sharad Agarwal, Seattle, WA (US); Alastair Wolman, Seattle, WA (US); David Chu, Kirkland, WA (US); Paramvir Bahl, Bellevue, WA (US); Lara Deek, Santa Barbara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 162 days.

(21) Appl. No.: 14/203,496

(22) Filed: Mar. 10, 2014

(65) Prior Publication Data

US 2015/0256641 A1 Sep. 10, 2015

(51) Int. Cl.
*H04L 29/08* (2006.01)
*G06F 17/30* (2006.01)

(52) U.S. Cl.
CPC .... *H04L 67/2847* (2013.01); *G06F 17/30861* (2013.01); *H04L 29/0881* (2013.01); *H04L 29/08837* (2013.01); *H04L 67/02* (2013.01); *H04L 67/04* (2013.01); *H04L 67/22* (2013.01); *H04L 67/26* (2013.01); *H04L 67/2861* (2013.01); *H04L 67/325* (2013.01)

(58) Field of Classification Search
None
See application file for complete search history.

(56) References Cited

U.S. PATENT DOCUMENTS

| | | | |
|---|---|---|---|
| 7,747,749 B1 * | 6/2010 | Erikson | G06F 17/30902 709/219 |
| 8,117,303 B2 | 2/2012 | Fonsen | |
| 8,457,653 B2 | 6/2013 | Ledlie | |
| 2003/0187984 A1 | 10/2003 | Banavar et al. | |
| 2004/0258053 A1 * | 12/2004 | Toporek | H04B 7/2126 370/352 |

(Continued)

FOREIGN PATENT DOCUMENTS

WO 2014/028672 A1 2/2014

OTHER PUBLICATIONS

Khan, et al., "CAMEO: A Middleware for Mobile Advertisement Delivery", In ACM MobiSys, Jun. 25, 2013, pp. 125-138.

(Continued)

*Primary Examiner* — Azizul Choudhury
(74) *Attorney, Agent, or Firm* — Alin Corie; Sandy Swain; Micky Minhas

(57) ABSTRACT

Application data prefetching embodiments are presented that prefetch and provide application data for use by an application operating on a mobile computing device during a period of disconnectivity from a communications network. In this way, an online experience can be achieved even during periods of network disconnectivity. In one implementation, application data is pushed to a mobile computing device by a cloud-based application data prefetching service. In another implementation, the mobile computing device takes on the tasks of prefetching the application data and providing it to the application.

16 Claims, 9 Drawing Sheets

(56) References Cited

U.S. PATENT DOCUMENTS

| | | | | |
|---|---|---|---|---|
| 2005/0154781 | A1* | 7/2005 | Carlson | G06F 17/30902 709/203 |
| 2007/0033155 | A1* | 2/2007 | Landsman | G06F 17/30899 |
| 2007/0033569 | A1* | 2/2007 | Davidson | G06F 17/30902 717/103 |
| 2010/0037204 | A1 | 2/2010 | Lin et al. | |
| 2010/0169407 | A1 | 7/2010 | Hsueh et al. | |
| 2011/0029670 | A1 | 2/2011 | Klein et al. | |
| 2011/0306304 | A1 | 12/2011 | Forutanpour et al. | |
| 2013/0103740 | A1* | 4/2013 | Tully | H04N 21/251 709/203 |
| 2013/0122934 | A1* | 5/2013 | Branch | H04W 4/02 455/456.3 |
| 2013/0147820 | A1* | 6/2013 | Kalai | G01C 21/32 345/522 |
| 2013/0159552 | A1* | 6/2013 | Xiang | H04L 69/40 709/246 |
| 2013/0226837 | A1 | 8/2013 | Lymberopoulos et al. | |
| 2013/0229976 | A1 | 9/2013 | Srinivasan et al. | |

OTHER PUBLICATIONS

Lymberopoulos et al., "PocketWeb: Instant Web Browsing for Mobile Devices", In Proceedings of the seventeenth international conference on Architectural Support for Programming Languages and Operating Systems, Mar. 3, 2012, pp. 1-12.

"International Search Report and Written Opinion Issued in PCT Application No. PCT/US2015/017886", Mailed Date: Aug. 13, 2015, 20 Pages.

Armstrong, et al., "Efficient and Transparent Dynamic Content Updates for Mobile Clients", In Proceedings of the 4th International Conference on Mobile Systems, Applications and Services, Jun. 19, 2006, pp. 56-68.

Curcio, et al., "Geo-Predictive Real-Time Media Delivery in Mobile Environment", In Proceedings of the 3rd Workshop on Mobile Video Delivery, Oct. 25, 2010, pp. 3-8.

Kao, et al., "An Offline Browsing System for Mobile Devices", In Proceedings of the 11th International Conference on Information Integration and Web-based Applications & Services, Dec. 14, 2009, pp. 338-343.

Siris, et al., "Enhancing Mobile Data Offloading with Mobility Prediction and Prefetching", In Proceedings of the Seventh ACM International Workshop on Mobility in the Evolving Internet Architecture, Aug. 22, 2012, pp. 17-22.

Zhao, et al., "O2SM: Enabling Efficient Offline Access to Online Social Media and Social Networks", In 14th International Middleware Conference, Dec. 9, 2013, pp. 445-465.

"Second Written Opinion Issued in PCT Application No. PCT/US2015/017886", Mailed Date: Jan. 29, 2016, 10 Pages.

"International Preliminary Report on Patentability Issued in PCT Patent Application No. PCT/US2015/017886", Mailed Date: Jun. 6, 2016, 11 Pages.

* cited by examiner

| Delimiter | File Type |
|---|---|
| {url="_", "http:_", "https:_", <link>, href="_", src="_"} * (*): All lowercase | Html, xml, xhtml, text, json, rss, soap, atom |

| Grammar Rules | URL Transformation |
|---|---|
| Substitution | $U_1 + U_2 \Rightarrow U_1 + S_{end}$<br>$U_1 + U_2 \Rightarrow S_{beg} + U_2$ |
| Concatenation | $U \Rightarrow S_{beg} + U + S_{end}$<br>$U \Rightarrow U + S_{end}$<br>$U \Rightarrow S_{beg} + U$ |

PREFETCHING APPLICATION DATA FOR PERIODS OF DISCONNECTIVITY

BACKGROUND

Along with the proliferation of mobile computing devices is the surge in mobile applications. There has also been a surge in wireless deployments, enlarging and improving areas of Internet connectivity. Typically, during times when a mobile computing device is wirelessly connected to the Internet via some form of communications network, either an application running on the mobile computing device requests web content and the like from an application server, or the application server attempts to push content to the application.

In the case of an application server attempting to push content to an application, a push system is typically employed. Such systems are a feature currently supported by multiple mobile operating system platforms. These push system typically enable an application server to push new content to an application operating on a mobile computing device. One such widely used system is the push notification. Push notification allows the application server to alert the mobile computing device user when new data is available. Often the push notification includes an embedded action. When a mobile device user clicks the notification, the embedded action launches the application and thereafter initiates a download of the new data. In addition, typically the application server is allowed to deliver a limited number of characters to a user's mobile device without user action. For example, the headline of the latest news might be pushed to a news application running on the mobile computing device.

Other push systems have recently emerged that seek to facilitate delivery of content to applications by forcing or initiating the download of content to a mobile computing device, without the device's or user's participation. More particularly, in one of these new push systems, content is downloaded when a mobile computing device is powering up. Others of these new push systems allow the background download of a single file once every 24 hours, after which push notifications are used to deliver limited content. Still another new push system does not actually push content to an application, but it prefetches the content prior to the application launching in order to reduce launch wait time. Once launched, the application requests the content in the normal manner.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The application data prefetching embodiments described herein generally prefetch and provide application data for use by an application operating on a mobile computing device during a period of disconnectivity from a communications network. In this way, an online experience can be achieved even when the mobile computing device is offline.

More particularly, one exemplary embodiment involves pushing application data to the mobile computing device. First, application traffic data is received from the mobile computing device. This application traffic data includes at least one computer network addresses specifying a network site where application data relevant to the application can be obtained. The received application traffic data is analyzed to identify the application data that is to be prefetched to enable operation of the application during a period of disconnectivity from a communications network. The identified application data is then prefetched, and at least some of this data is provided to the mobile computing device during times when the mobile computing device is connected to a communications network.

The pushing of application data to a mobile computing device is handled in one implementation by a cloud-based application data prefetching service. In this implementation, the mobile computing device collects and stores the aforementioned application traffic data, and periodically provides it to the service via a communications network. In addition, the mobile computing device receives and stores prefetched application data from the service, or an intermediary pre-staging site, via a communications network. As indicated previously, the prefetched application data is used by the application to enable operations during a period of disconnectivity.

In another exemplary embodiment, a cloud-based service is not involved and the mobile computing device takes on the tasks of prefetching the application data and providing it to the application. In this exemplary embodiment, the mobile computing device collects and stores the aforementioned application traffic data, and then analyzes it to identify the application data that is to be prefetched to enable operation of the application during a period of disconnectivity from a communications network. In addition, the mobile computing device prefetches the identified application data. Then, when the application is operating on the mobile computing device during the period of disconnectivity, a virtual connected-network interface is simulated for the application. This simulated interface intercepts requests from the application for application data and provides stored prefetched application data corresponding to each intercepted request to the application when prefetched application data corresponding to an intercepted request has been stored. If the requested application data has not been prefetched and stored, then a non-availability message is issued.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
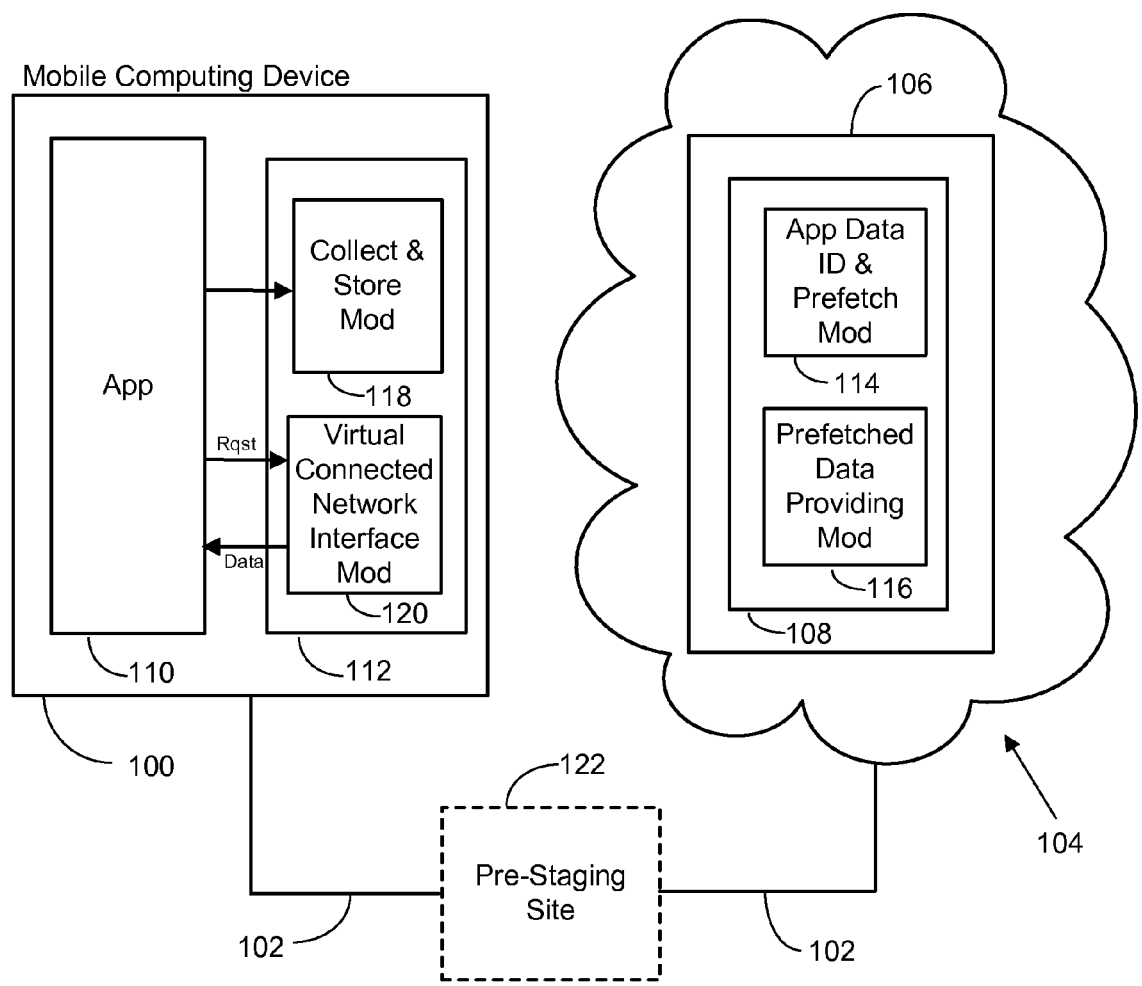
FIG. 1 is a diagram of an exemplary embodiment, in simplified form, of an architectural framework for implementing the application data prefetching embodiments described herein.

In the following description of application data prefetching embodiments reference is made to the accompanying drawings which form a part hereof, and in which are shown, by way of illustration, specific embodiments in which application data prefetching may be practiced. It is understood that other embodiments may be utilized and structural changes may be made without departing from the scope of the application data prefetching.

It is also noted that for the sake of clarity specific terminology will be resorted to in describing the application data prefetching embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the application data prefetching. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the application data prefetching does not inherently indicate any particular order not imply any limitations thereof.

The following terms will be used throughout the description and so will be defined here for convenience. The term "application data" is used herein to generally refer to web content such as textual, visual or aural content including, but not limited to, text, images, sounds, videos and animations found on a network site (e.g., an Internet or private intranet site), as well as any associated metadata and the like. In addition, the term "mobile computing device" is used herein to generally refer to a portable device such as by way of example, but not limitation, a laptop or notebook computer, smart phone, tablet computer, personal data assistant (PDA), and the like. Further, the term "disconnectivity" (as in a period of disconnectivity) is used herein and in the claims to generally refer to a connection to a communication network that is non-existent, or too weak or slow based on prescribed thresholds.

1.0 Prefetching Application Data for Periods of Disconnectivity

The application data prefetching embodiments described herein generally prefetch application data for use by an application operating on a mobile computing device during a period of disconnectivity from a communications network. In this way, an online experience need not only be achieved during periods of connectivity. Rather, the illusion of a connectivity experience can be extended to periods of disconnectivity.

Given that a mobile computing device is typically connected to a communication network at least one point during a day, it is possible to exploit the periods of connectivity to obtain prefetched application data. The prefetched application data is then used to create an illusion of an online experience during periods of disconnectivity. This has implications both in terms of a seamless online user experience, potentially lower bandwidth cost through usage of cheaper networks (such as Wi-Fi), and more efficient usage of battery life (as will be described in more detail later).

The application data prefetching embodiments described herein are focused on applications operating on a mobile computing device. Typically, more web content is accessed through applications than via a mobile browser. This makes focusing on applications, rather than general browsing, quite relevant. It is noted that application behavior and access to web content (which will more broadly be referred to as application data in the descriptions to follow) differs significantly from that of general browsers.

FIG. 1 illustrates an exemplary embodiment, in simplified form, of an architectural framework for implementing the application data prefetching embodiments described herein. As exemplified in FIG. 1, the architectural framework includes one or more mobile computing devices 100 (one of which is shown), one or more communications networks 102, and the cloud 104. As is appreciated in the art of cloud computing, the cloud 104 generally includes a plurality of cloud computing devices 106 (one of which is shown) that can be located in different geographic regions. The network 102 allows the mobile computing devices 100 to communicate with and exchange information with the cloud computing devices 106. It will be appreciated that the network 102 can employ a wide variety of local and wide area networking technologies. By way of example but not limitation, in an exemplary embodiment the aforementioned communication is accomplished using the Internet, or a proprietary intranet, over any appropriate communications network 102 (such as a cellular or Wi-Fi network, or an Internet service provider's cable loop utilization, or a DSL (digital subscriber line) network).

Referring again to FIG. 1, by way of example but not limitation, the mobile computing device 100 can be a smartphone, or a tablet computer, or a personal digital assistant, or a wearable device, or the like. Users (not shown) employ the mobile computing devices 100 to run an application 110. It is noted that a user can run multiple applications on a mobile computing device either separately or at the same time. However, for convenience only one application will be addressed in this description as the architecture and processes are simply repeated for other applications. The mobile computing device is used to host a prefetched application data manager 112.

Referring again to FIG. 1, one or more of the cloud computing devices 106 are used to host an application data prefetching service 108. It is noted that while the application data prefetching service 108 is shown in FIG. 1 as operating on a single computing device 106, this need not be the case. Rather, the components of the service can be distributed among multiple cloud computing devices that are in communication with each other via any appropriate communications network (which is not shown).

The cloud-based application data prefetching service 108, and the mobile device-based prefetched application data manager 112, will now be described in more detail.

1.1 Application Data Prefetching Service

Referring to FIG. 1 once again, the application data prefetching service 108 includes two high-level components—namely an application data identification and prefetching module 114, and a prefetched data providing module 116. The application data identification and prefetching module 114 generally identifies computer network addresses that are then used to prefetch the application data needed by the application running on the mobile computing device to operate during a period of disconnectivity. The prefetched data providing module 116 pushes the prefetched application data to the mobile computing device 100 in a variety of intelligently determined and cost-effective ways.

Figures 2, 3:
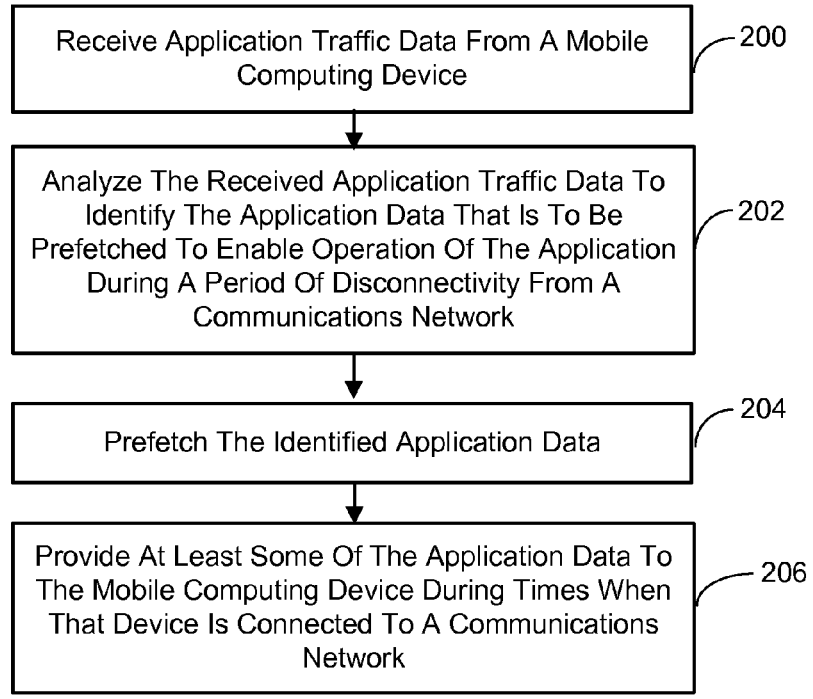
FIG. 2 is a flow diagram generally outlining one embodiment of a process for pushing application data to a mobile computing device.
FIG. 3 shows a table that lists the delimiter and file types of an exemplary set of regular expression that can be used to identify embedded URLs.

FIG. 2 outlines a general embodiment of a process for pushing application data to a mobile computing device using the above-described modules. First, one or more computing devices receive application traffic data from a mobile computing device (process action 200). This application traffic data generally includes at least one computer network addresses specifying a network site where application data relevant to the application can be obtained. The received application traffic data is analyzed to identify the application data that is to be prefetched to enable operation of the application during a period of disconnectivity from a communications network (process action 202). The identified application data is then prefetched (process action 204). In one implementation, the previously-described application data identification and prefetching module is tasked with the foregoing process actions. Next, at least some of the application data is provided to the mobile computing device during times when that device is connected to a communications network (process action 206). In one implementation, the previously-described prefetched data providing module performs this last task. Each of the foregoing actions will now be described in more detail.

1.1.1 Receiving Application Traffic Data

Application traffic data collectively refers to the requests made for application data via a communications network by an application running on a mobile computing device and interactions of a user of the mobile computing device with the application (past application traffic), as well as the application data returned in response to those requests (fetched application data traffic). As will be described in more detail later in this description, the prefetched application data manager resident on the mobile computing device is tasked with collecting the application traffic data during times when the application is operating, and interacting with sites where the application data is obtained and/or with the user. It is the collected application traffic data that is received by the application data prefetching service from a mobile computing device.

To minimize the load imposed by the application traffic data when it is analyzed, in one embodiment, appropriate filters are employed to eliminate unnecessary overhead created by non-text and non-application MIME type payloads. It is noted that in an alternate application data prefetching embodiment, this filtering action could be performed by the prefetched application data manager resident on the mobile computing device instead, before it is sent to the application data prefetching service. The application data prefetching service analyzes the application traffic data (filtered or not), as will be described next.

1.1.2 Analyzing Application Traffic Data

Once the application traffic data has been received, it is analyzed to identify the relevant application data. It is noted that the application data used by an application running on a mobile computing device is generally obtained via a computer network address found in the aforementioned application traffic data. Thus, in one embodiment, analyzing the received application traffic data to identify the relevant application data involves identifying one or more computer network addresses that can be used to access a network site where the relevant application data can be obtained. Typically, the computer network address will be a Uniform Resource Locator (URL). For convenience the descriptions to follow will refer to URLs, however it is understood that any other computer network address format could be employed instead of or in addition to URLs.

There are two general types of URLs that an application typically requests to obtain application data: static and embedded URLs. A static URL is one that is hardcoded into the application code itself. Thus, in one embodiment, the aforementioned identifying of one or more computer network addresses includes identifying one or more computer network addresses hardcoded in the application.

Typically, application data associated with a static URL is consistently fetched when an application is first launched, or when a major placeholder of the application is selected for viewing (such as the sports section of a news application). As such, in one embodiment, identifying a static URL involves finding those URLs that are frequently or consistently fetched across multiple runs of a given app. However, cache expiration should also be factored into the identification of a static URL. In the case where a particular URL is not fetched in a given run, it might be that a copy already exists in the application's cache, and the copy has not expired yet. This means that although the URL was not fetched, the application data accessed by it might still have been used by the application. Since it is typically not feasible to access the contents of a mobile application's private cache, in one embodiment, the cache-control time-to-live (TTL) directives of hypertext transfer protocol (HTTP) messages are monitored instead so as to keep track of the cache expiration times. With this knowledge, it is possible to accurately predict the number of times an application requested a given URL, independent of whether the associated application data was fetched from local cache or the application server. This improves static URL prediction by improving the accuracy of computing URL request frequency.

As for embedded URLs, these may be found in the text and tag data associated with a static URL, or may be extracted from previous received application data. Given that URLs linking to application data can be found in a static URL or in previously-received application data, in one embodiment, the aforementioned identifying of one or more computer network addresses includes identifying one or more supplemental computer network addresses listed in the application data obtained using the identified hardcoded computer network address or addresses. Still further, more URLs can be found in previous received application data accessed using a supplemental URL. Given this, in one embodiment, the aforementioned identifying of one or more computer network addresses includes identifying one or more additional computer network addresses listed in the application data obtained using the identified supplemental computer network address or addresses.

In one embodiment, embedded URLs are identified (and extracted) from text and tags in a previously-identified URL address or in application data accessed via a previously-identified URL address using a prescribed list of regular expressions. It is noted that these regular expressions are able to bypass encoding restrictions. The table shown in FIG. 3 lists the delimiter and file types that can be used to identify embedded URLs.

It is noted that embedded URLs can take two different forms—namely modified and verbatim. The difference between the two embedded URL forms is that when the embedded links in the HTTP response payload are changed (e.g., by adding literals and/or replacing others in the link) before being requested, the link is considered a modified URL, whereas a link is considered a verbatim URL if it is requested as it appears. It is estimated that up to 50% of an application's requested application date is associated with modified URLs.

Figure 4:
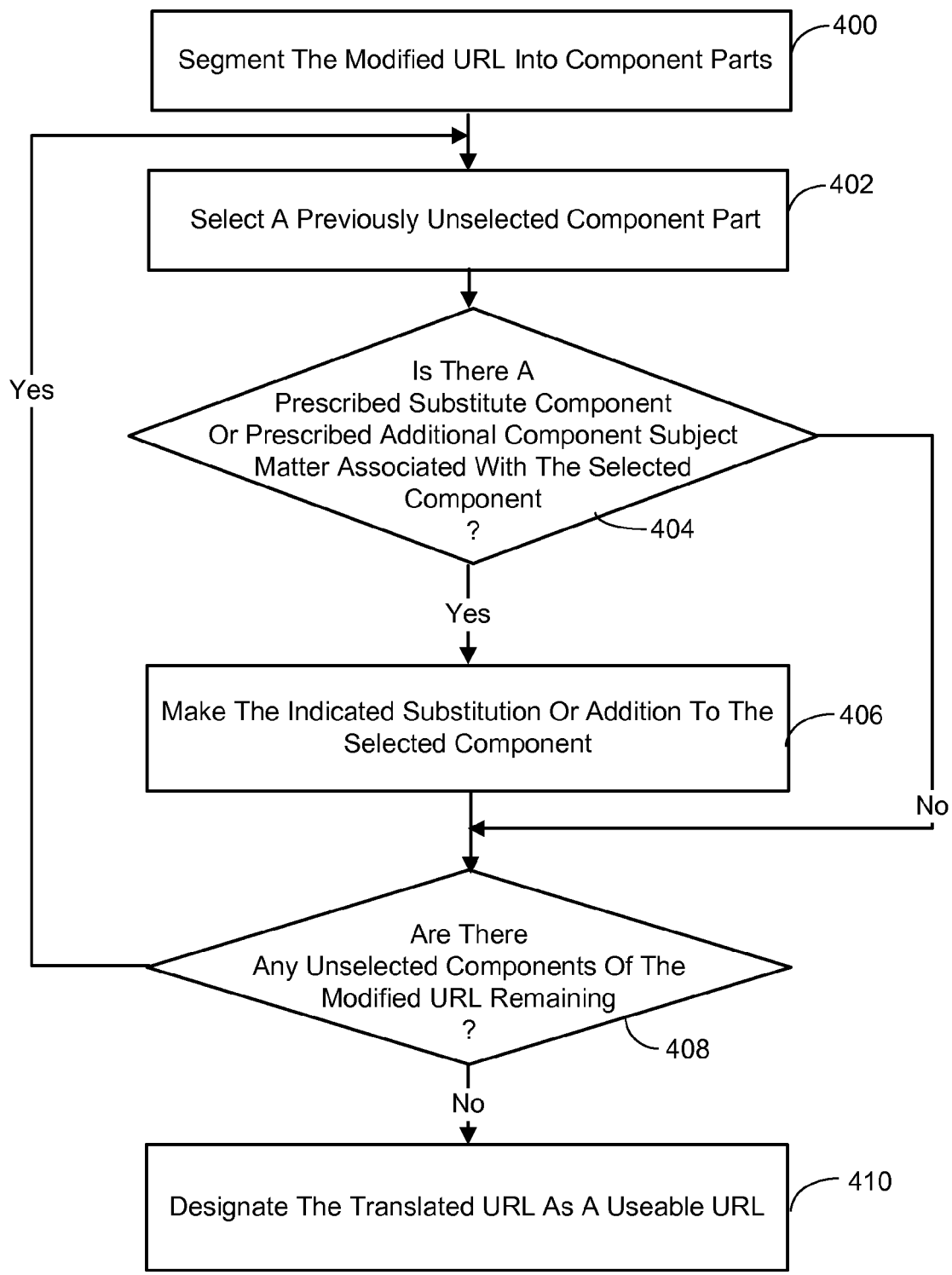
FIG. 4 is a flow diagram generally outlining one embodiment of a process for identifying one or more computer network addresses that includes translating addresses exhibiting a modified form into a useable form that can be use to access a network site.

Thus, in one embodiment, part of identifying one or more computer network addresses includes translating addresses exhibiting a modified form into a useable form that can be use to access a network site. Referring to FIG. 4, in one exemplary implementation, this translation involves first segmenting a modified URL into component parts (process action 400) using conventional URL segmenting methods. Next, a previously unselected component part is selected (process action 402), and it is determined if there is a prescribed substitute component or prescribed additional component subject matter associated with the selected component (process action 404). If there is, the indicated substitution or addition is made to the selected component (process action 406). If not, no change is made to the selected component. It is then determined if there are any unselected components of the modified URL remaining (process action 408). If so, then process actions 402 through 408 are repeated as appropriate. Otherwise, the now completely translated URL is designated as a useable URL (process action 410), and the procedure ends.

Figures 5, 6:
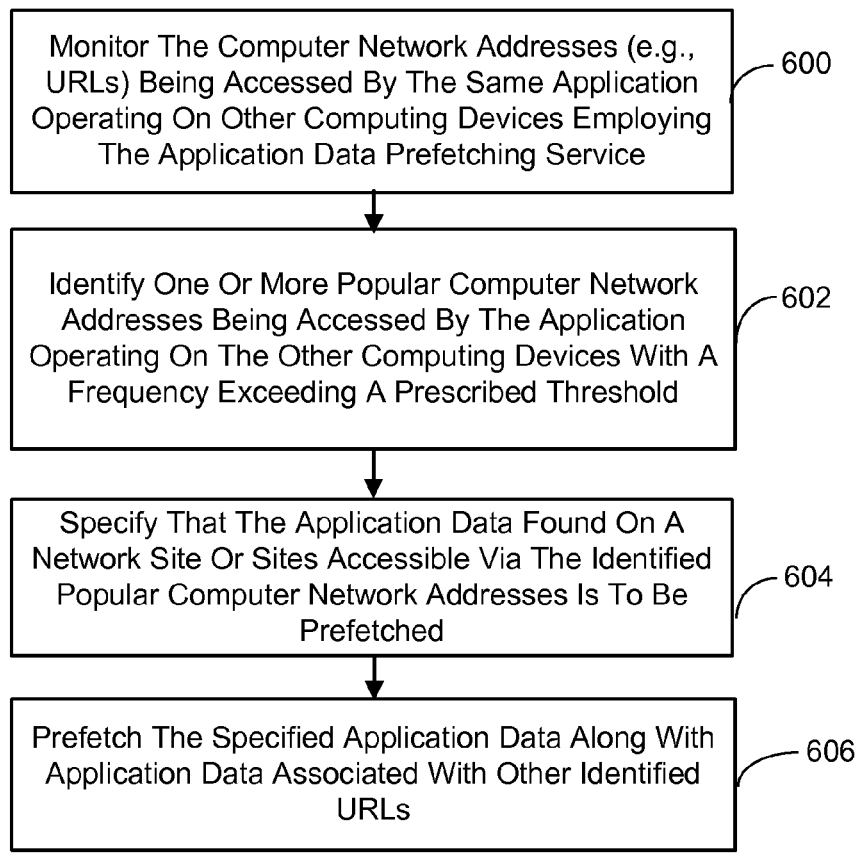
FIG. 5 shows a table that provides an exemplary set of grammatical rules that can be used to translate modified URLs.
FIG. 6 is a flow diagram generally outlining one embodiment of a process for obtaining URLs to add to the list of identified URLs based on their popularity with other users of the same application.

The list of prescribed substitute components or prescribed additional component subject matter associated with a modified URL component can be generated using a machine translation scheme to create a translation library based on a comparison of the modified URL to a corresponding URL used by an application to access application data, as well as by using common translations. The table shown in FIG. 5 provides an exemplary set of grammatical rules that can be used to translate modified URLs.

In addition to the above-described static and embedded URLs, in one embodiment, URLs accessed by the user of the mobile computing device through an application are extracted from the application traffic data and included in the list of identified URLs. Further, in one embodiment, the application data prefetching service obtains URLs to add to the list of identified URLs based on their popularity with other users of the same application. For example, referring to FIG. 6, one implementation of this involves first monitoring the computer network addresses (e.g., URLs) being accessed by the same application operating on other computing devices employing the application data prefetching service (process action 600). One or more popular computer network addresses being accessed by the application operating on the other computing devices with a frequency exceeding a prescribed threshold are identified (process action 602), and application data found on a network site or sites accessible via the identified popular computer network addresses is specified for prefetching (process action 604). This application data is then prefetched along with application data associated with other identified URLs (process action 606).

It is noted that in some cases an application requires user authentication credentials when it fetches application data. In such case it may be impossible to fetch the application data associated with the identified URLs without impersonating the user by employing the user's credentials. Thus, application authentication mechanisms (such as a cookie system or OAuth2 protocol) need to be identified and mimicked.

1.1.3 Prefetching Application Data

As indicated above, the previously-identified application data is prefetched. In one embodiment, this involves prefetching all the identified application data, while in another embodiment only some of the identified application data is prefetched.

In the case of prefetching just some of the identified application data, one implementation employs a ranking scheme. In this implementation, analyzing the received application traffic data involves identifying a plurality of computer network addresses (e.g., URLs). Each of these addresses can be used to access a network site where relevant application data can be obtained. The addresses are ranked, and then only application data found on sites corresponding to a prescribed number of the highest ranked of the identified computer network addresses is prefetched.

Several ranking factors can be taken into consideration when ranking the identified computer network addresses. In one embodiment, the frequency each network address is accessed by the application is determined, and the addresses are ranked at least in part by the frequency they are accessed. In this scheme, the higher the frequency, the higher the rank. In another embodiment, an access pattern including the temporal order that the application accesses the identified computer network addresses is determined, and the addresses are ranked at least in part by the temporal order. In this case, the earlier-accessed computer network addresses are ranked higher than the later-accessed addresses. In yet another embodiment, a frequency of keywords associated with text and tags found in the identified computer network addresses, or associated with application data obtainable via the identified computer network addresses, or both, are determined. The addresses are then ranked at least in part by the frequency of their associated keywords. Here, the higher the frequency of the associated keywords, the higher the rank of the address. It is noted that other ranking schemes can also be employed, and that these ranking schemes can be used alone, or in combination to establish a rank for each of the identified computer network addresses. Any appropriate conventional method for combining ranking factor can be employed to accomplish this latter task.

Once the identified computer network addresses have been ranked, it is decided what portion of the content accessed by them will be prefetched. In one simple embodiment, the application data associated with the highest ranking addresses is prefetched up to a prescribed byte limit (e.g., 100 MB). In other words, the prefetching would start with the highest ranked URL and then proceed down the list and stop when the total amount of application data downloaded reaches the prescribed limit.

However, in one alternate embodiment, the prescribed number of the highest ranking addresses whose application data is prefetched varies depending on one or more external factors. By way of example, and not limitation, this number can be based on at least one of the following factors. First, the remaining battery power available on the mobile computing device can be taken into consideration. In one implementation, the prescribed number is set higher in direct proportion to the amount of remaining battery power available. Another factor that can be considered is a measure of the current performance of the communications network. In one implementation, the prescribed number is set higher in direct proportion to a higher measure of the current network performance. Yet another factor is the anticipation of a period of extended disconnectivity. In one implementation, the prescribed number is set higher whenever an extended period of disconnectivity is anticipated because it is assumed more application data will be needed for the application to operate over this extended period of time.

In order to implement some of the foregoing factors in determining how much application data to prefetch and when, in one embodiment, in addition to receiving application traffic data, environment data is also received from the mobile computing device. In one implementation, this environmental data is predictive of when a period of disconnectivity will occur (and if possible how long the period might be). As indicated above, this predicitive information is used to facilitate scheduling of the application data prefetching (and the amount) so that it can be provided prior to the predicted period of disconnectivity. It is noted that the type of environmental data that can be collected and provided by the mobile computing device (such as mobile device battery status, user mobility, location, and network history (including periods of Wi-Fi connectivity, cellular connectivity, and disconnectivity), user data (including calendar events and emails), as well as the logic involved in estimating disconnectivity periods and length, has been studied extensively. As such, for the purposes of the application data prefetching embodiments described herein currently available methods are employed to accomplish the collecting and analysis of mobile computing device environmental data.

1.1.4 Providing Prefetched Application Data

As described previously, at least some of the available prefetched application data is provided to the mobile computing device during times when that device is connected to a communications network. Ideally, all the application data prefetched since application data was last provided to the mobile computing device would be provided. However, even if the foregoing measures are taken to anticipate how much application data is needed for a potential upcoming period of disconnectivity and when it should be provided, it is only an estimate. Thus, at times not all the last-fetched prefetched application data can be provided during an available period of connectivity. In such as case, at least some of the available data is provided, and ideally as much of the data as possible is provided.

It is noted that one of the things that can be learned from analyzing the environmental data received from the mobile computing device, is when and where the device will typically be found in a location where a period of connectivity is available to the mobile computing device. This is particularly valuable if a period of Wi-Fi connectivity is anticipated. Often data can be downloaded to a mobile computing device via a Wi-Fi connection at a reduced cost. For example, downloading data via a Wi-Fi connection is sometimes free. To this end, in one embodiment, the task of providing at least some of the prefetched application data to the mobile computing device during times when that device is connected to a communications network, involves providing the application data during a period of Wi-Fi connectivity so as to reduce a cost to a user of the mobile computing device for receiving the application data. This is facilitated by the aforementioned prediction of when and where such a period of Wi-Fi connectivity will occur.

It is further noted that because the location of a period of connectivity can be predicted, the prefetched application data can be conveniently pre-staged at a network site that the mobile communication device accesses via a communications network during such a period. For example, the communication network could be a Wi-Fi network, and the location a Wi-Fi hot spot. This would not only be an efficient way to provide the prefetched application data, but a cost effective one as well. Referring to FIG. 1 once again, the above-described optional pre-staging site 122 is shown by the broken line box between the mobile computing device 100 and the cloud 104. Note that in one embodiment of the architecture, the communications network 102 can be split into multiple different communication networks (not shown). For example, the communication network linking the cloud 104 to the optional pre-staging site 122 can be one type of communication network (e.g., DSL), while the communication network linking the optional pre-staging site 122 to the mobile computing device 100 can be a different type of communications network (e.g., Wi-Fi). Even in embodiments without the optional pre-staging site, the type of communications network used by the mobile computing device to send the application data traffic (and possibly environmental data) to the application data prefetching service can be one type of communication network (e.g., cellular), while the communication network used by the application data prefetching service to send the prefetched application data to the mobile computing device can be a different communication network (e.g., Wi-Fi). Further, with regard to the aforementioned pre-staging of application data, the prefetched application data can be packaged in one or more files (such as in a compressed zip file) and then pre-staged. For example, in embodiments where the amount of prefetched application downloaded is limited to a prescribed amount of bytes (e.g., 100 MB), that amount of data can be packaged in a file and pre-staged for downloading.

In yet another embodiment, in addition to the application data prefetching service pushing application data to the mobile computing device during anticipated periods of connectivity, prefetched application data can also be sent to the mobile computing device in response to the receipt of an instruction from the mobile computing device to provide the data. For example, the user of the mobile computing device could realize that he or she will be unexpectedly offline and wish to download application data ahead of time. To do so, the user would cause the aforementioned instruction to be sent from the mobile computing device via a conventional user interface, such as by selecting a prefetched application data download icon on a touch screen of the mobile computing device.

1.2 Prefetched Application Data Manager

Referring to FIG. 1 once again, the prefetched application data manager 112 resident on the mobile computing device 100 includes two high-level components—namely a collection and storage module 118, and a virtual connected-network interface module 120. The collection and storage module 118 generally collects and stores the previously-described application traffic data (as well as, in one embodiment, the mobile device environmental data). The module 118 also is tasked with periodically providing the application traffic data (and possibly environmental data) to the application data prefetching service 108. The virtual connected-network interface module 120 generally makes the stored application data available to an application during periods of disconnectivity.

Figure 7A:
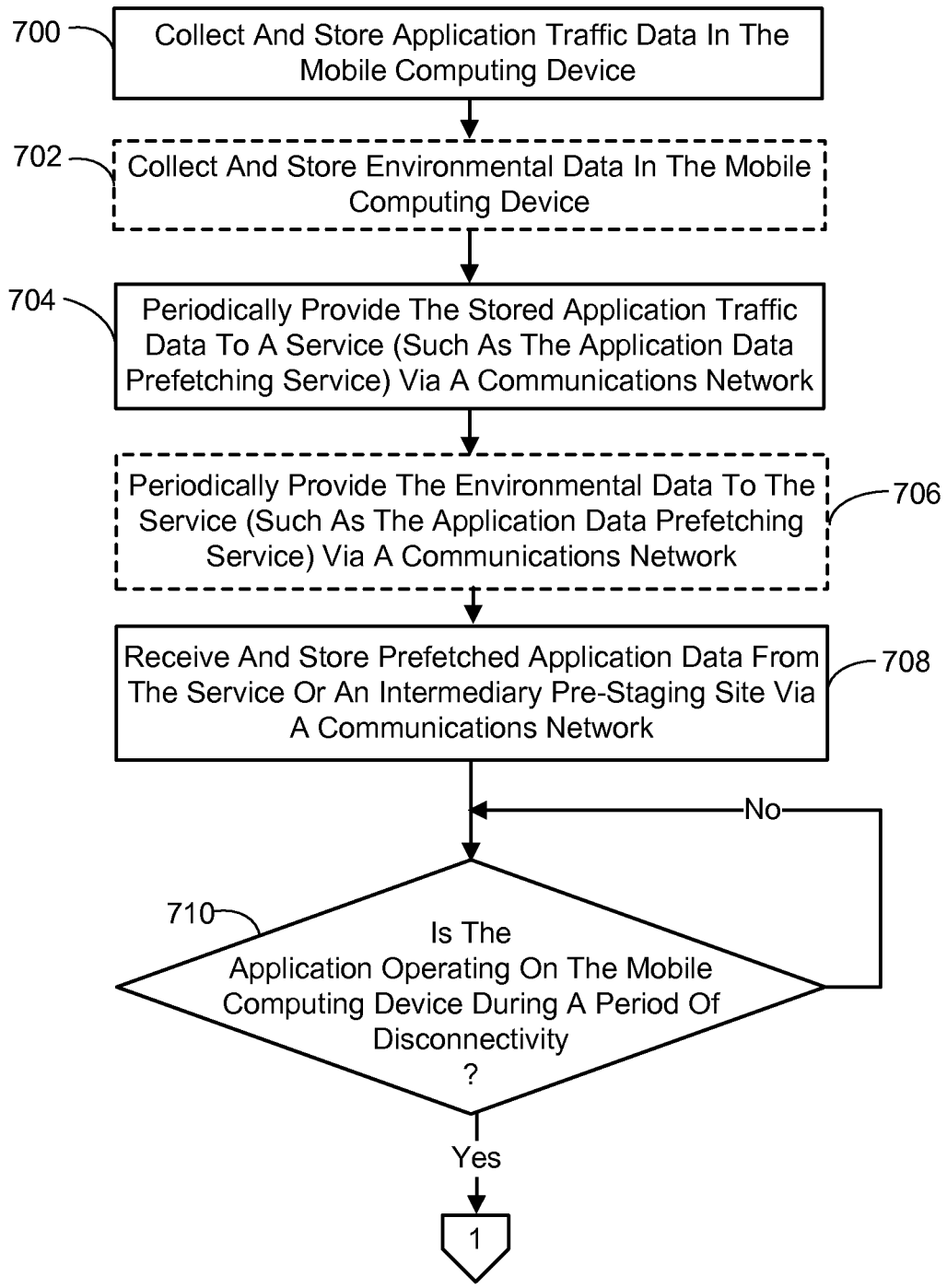
FIGS. 7A-B depict a continuing flow diagram generally outlining one embodiment of a process for providing prefetched application data to an application during a period of disconnectivity from a communications network
Figure 7B:
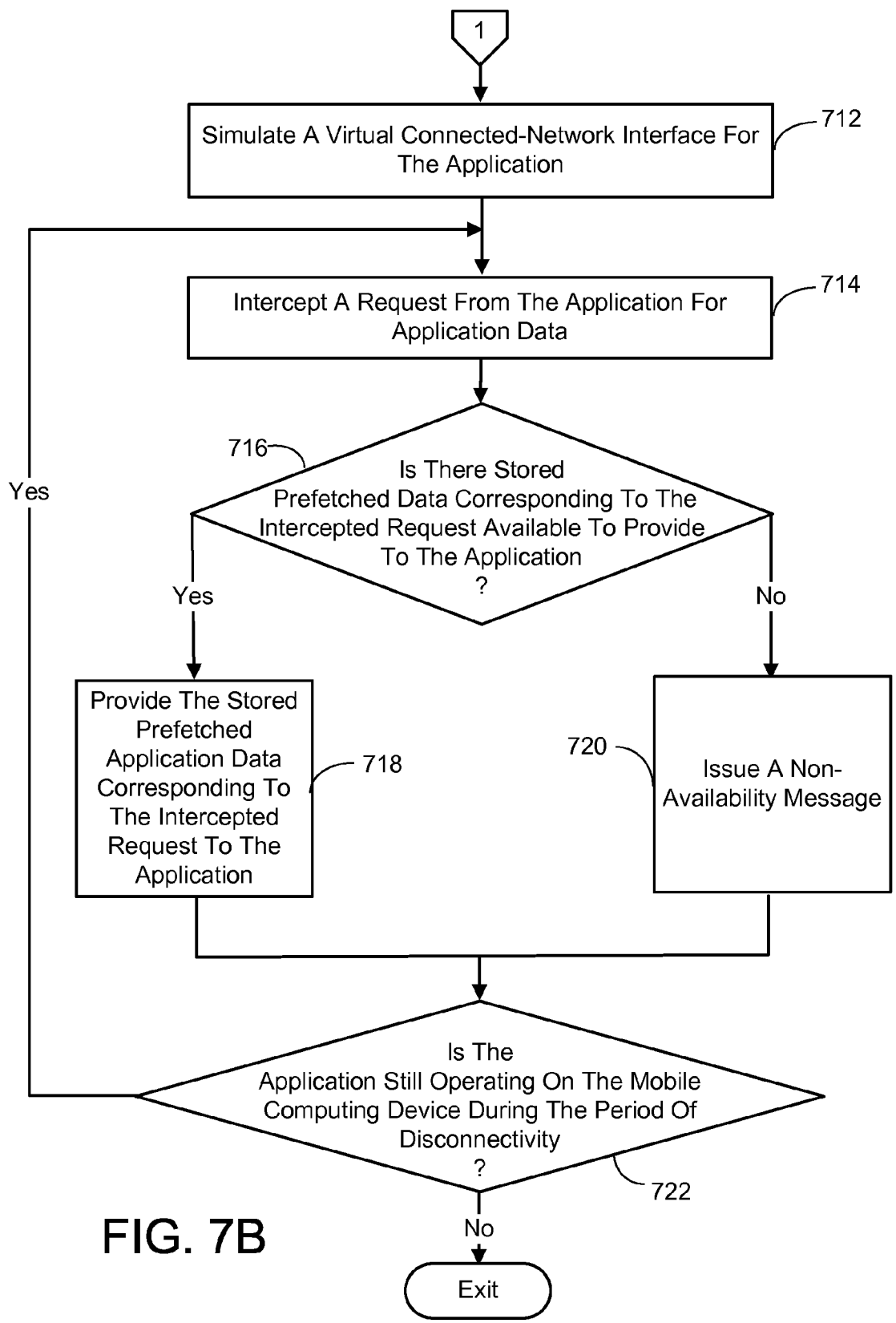

FIGS. 7A-B outline a general embodiment of a process for providing prefetched application data to an application during a period of disconnectivity from a communications network, where the application is operating on a mobile computing device and the process is implemented via a computer program having program modules executable by the mobile computing device. The process begins with application traffic data being collected and stored in the mobile computing device (process action 700). As described previously, the application traffic data includes at least one computer network addresses specifying a network site where application data relevant to the application can be obtained. The stored application traffic data is periodically provided to a service (such as the previously-described application data prefetching service) via a communications network (process action 704). In response, prefetched application data is received from the service or an intermediary pre-staging site via a communications network and stored (process action 708). The prefetched application data represents data the application uses to enable operations during a period of disconnectivity. In one implementation, the previously-described collection and storage module is tasked with the foregoing process actions. It is next determined if the application is operating on the mobile computing device during a period of disconnectivity (process action 710). If not the mobile computing device continues monitoring for a period of disconnectivity. If, however, it is determined the application is operating on the mobile computing device during a period of disconnectivity, then a virtual connected-network interface is simulated for the application (process action 712). The virtual connected-network interface intercepts a request from the application for application data (process action 714). It is then determined if there is stored prefetched data corresponding to the intercepted request available to provide to the application (process action 716). If there is, the stored prefetched application data corresponding to the intercepted request is provided to the application (process action 718). If, however, prefetched application data corresponding to an intercepted request has not been stored, then the virtual connected-network interface issues a non-availability message (process action 720). In one implementation, the non-availability message is a HTTP 404 message. It is next determined if the application is still operating on the mobile computing device during the period of disconnectivity (process action 722). If so, process actions 714 through 722 are repeated. Otherwise the process ends. In one implementation, the previously-described virtual connected-network interface module is tasked with the foregoing actions starting with process action 710. It is further noted that with regard to the aforementioned non-availability message, in an alternate embodiment the non-availability message is not issued when prefetched application data corresponding to an intercepted request has not been stored. Instead the virtual connected-network interface module makes the application think the URL is being fetched but the network is simply slow. Since applications are typically written in an asynchronous fashion with respect to network communication, this should not impede the user experience. In addition, it might even avoid the application crashing or issuing an error message to the user because it was not expecting a non-availability message.

It is noted that in embodiments where the previously-described mobile computing device environmental data is also supplied to the application data prefetching service, the foregoing process is modified to include collecting and storing the environmental data in the mobile computing device (process action 702). In addition, the environmental data is periodically provided to a service (such as the previously-described application data prefetching service) via a communications network (process action 706). The optional nature of these two actions is indicated by the broken line boxes in FIG. 7A.

It is further noted that in the design of both the collection and storage module and a virtual connected-network interface module, it was desired that these modules not require modifications to application functionality or contribution from the associated application server. As will be seen in the description to follow, this has been accomplished.

1.2.1 Collect and Store Application Traffic Data

As indicated previously, the application traffic data is collected and stored in the mobile computing device. In one embodiment, this is accomplished by running a local proxy server on the mobile computing device that intercepts and monitors the aforementioned application traffic data and periodically feeds this data to the application data prefetching service. In one implementation, the application traffic data is collected at least in part by recording URL HTTP GET requests. The local proxy server can be implemented using the Telerik Corporation's FiddlerCore.net class library, which is designed with the ability to run as a background process with no user-interface.

It was described previously that the application data prefetching service can minimize the load imposed when analyzing the application traffic data by using appropriate filters to eliminate unnecessary overhead created by non-text and non-application MIME type payloads. Alternately, this filtering can be accomplished by the prefetched application data manager resident on the mobile computing device instead, before it is sent to the application data prefetching service.

In addition, it was described previously that the application data prefetching service analyzes the application traffic data to identify computer network addresses (e.g., URLs). However, in an alternate embodiment, this function would be accomplished by the prefetched application data manager resident on the mobile computing device instead. In this alternate embodiment, the prefetched application data manager would send a URL summary listing all the identified URLs to the application data prefetching service in lieu of the application traffic data.

1.2.2 Virtual Connected-network Interface

As also indicated previously, the virtual connected-network interface module makes the stored prefetched application data available to an application running on a mobile computing device during periods of disconnectivity from a communications network. In one embodiment, this is accomplished using a local proxy server with caching functionality that intercepts application requests and feeds back the prefetched application data it has available in cache. One way of implementing the local proxy server is by using the aforementioned Telerik Corporation's FiddlerCore.net class library.

However, not all applications are designed to display old application data when offline. In fact, some applications will not display any content when they detect that the mobile computing device is disconnected. In order to bypass this limitation in these types of applications, without modifying application code, the virtual connected-network interface module fakes device connectivity. In one implementation this is accomplished by disabling the feature the mobile computing device's operating system employs to indicate connectivity status to applications during periods of disconnectivity. This feature would then be re-enabled during periods of connectivity, and the virtual connected-network interface is disabled.

2.0 Exemplary Operating Environments

Figure 8:
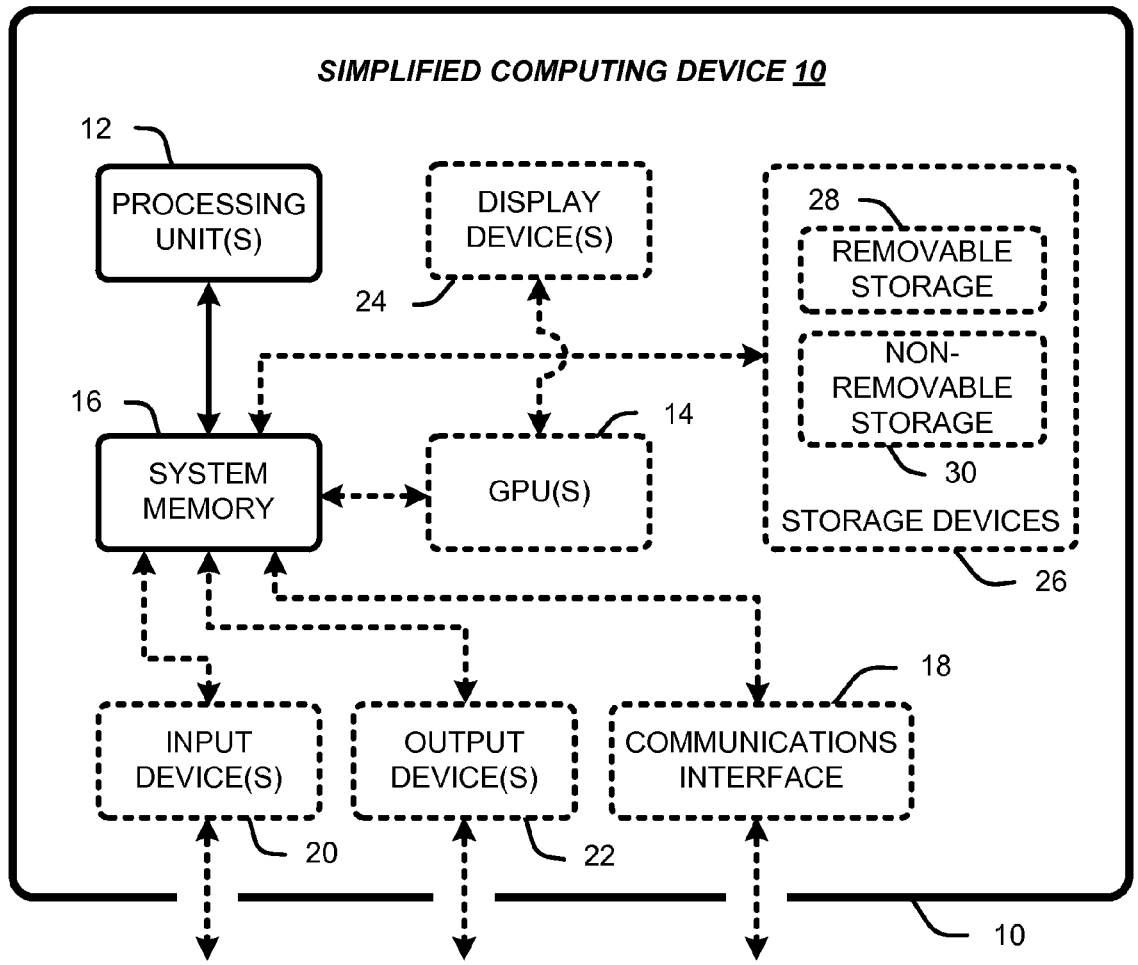
FIG. 8 is a diagram depicting a general purpose computing device constituting an exemplary system for implementing application data prefetching embodiments described herein.

The application data prefetching embodiments described herein are operational within numerous types of general purpose or special purpose computing system environments or configurations. FIG. 8 illustrates a simplified example of a general-purpose computer system on which various embodiments and elements of the application data prefetching, as described herein, may be implemented. It is noted that any boxes that are represented by broken or dashed lines in the simplified computing device 10 shown in FIG. 8 represent alternate embodiments of the simplified computing device. As described below, any or all of these alternate embodiments may be used in combination with other alternate embodiments that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the application data prefetching embodiments described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 shown in FIG. 8 may also include other components such as a communications interface 18. The simplified computing device 10 may also include one or more conventional computer input devices 20 (e.g., pointing devices, keyboards, audio (e.g., voice) input devices, video input devices, haptic input devices, gesture recognition devices, devices for receiving wired or wireless data transmissions, and the like). The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various application data prefetching embodiments described herein, or portions thereof, may be stored, received, transmitted, or read from any desired combination of computer-readable or machine-readable media or storage devices and communication media in the form of computer-executable instructions or other data structures.

Finally, the application data prefetching embodiments described herein may be further described in the general context of computer-executable instructions, such as program modules, being executed by a computing device. Generally, program modules include routines, programs, objects, components, data structures, and the like, that perform particular tasks or implement particular abstract data types. The application data prefetching embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

3.0 Other Embodiments

While the analysis of application traffic data, as well as the prefetching and providing the application data, were described as being accomplished by a cloud-based application data prefetching service in the foregoing description, in an alternate embodiment these tasks could be accomplished in a standalone mobile computing device. In this alternate embodiment, the previously-described application data identification and prefetching module, and prefetched data providing module, would reside in the mobile computing device rather than in a cloud-based service. Most of the features described previously would apply to this standalone embodiment as well, with the exception of those involved with sending the application data to the mobile computing device. In addition, while a communication network linking the mobile computing device to the application data prefetching service would not be needed, the network would still be used to communicate with network sites from which the application data is prefetched.

Figure 9A:
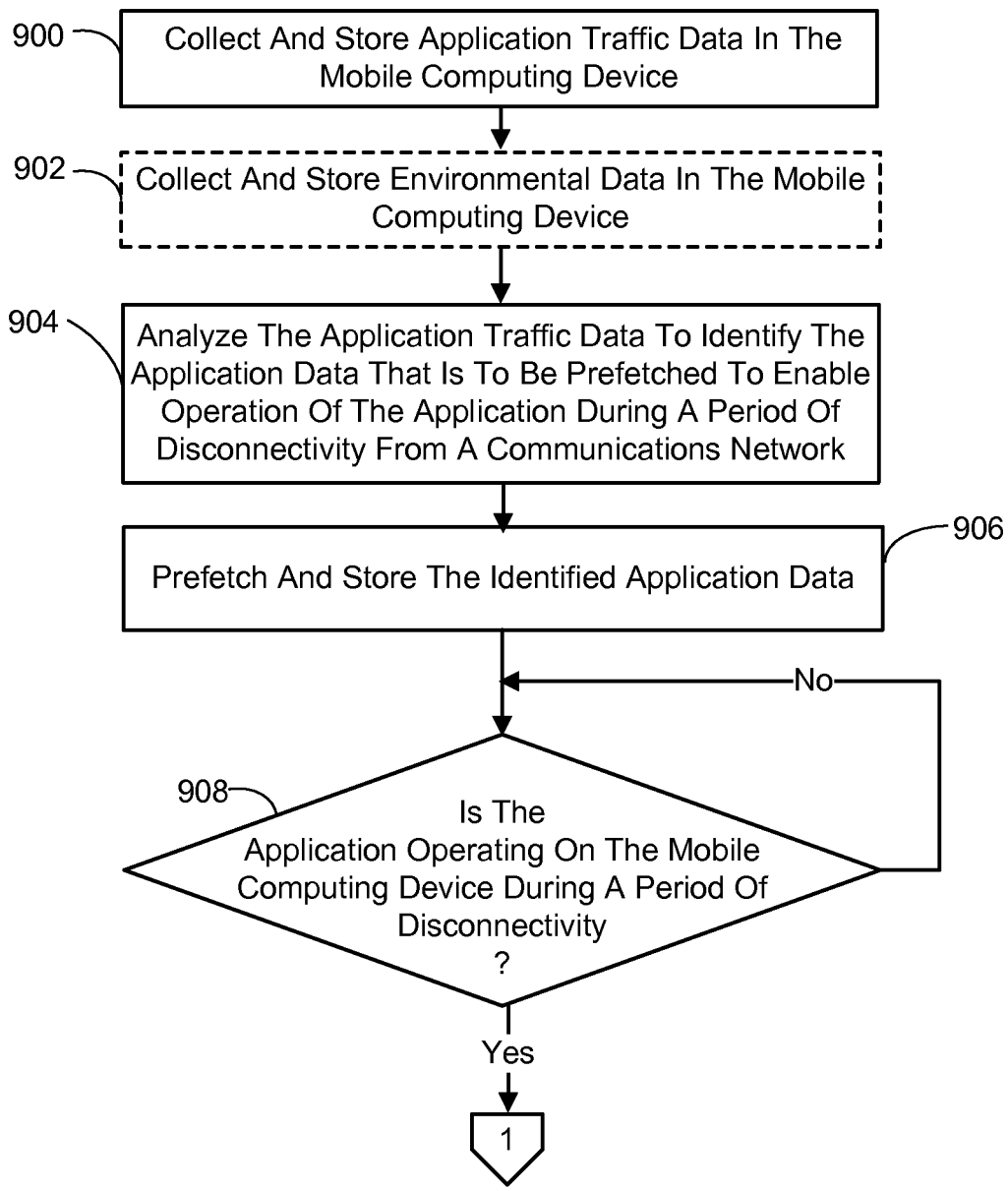
FIGS. 9A-B depict a continuing flow diagram generally outlining one embodiment of a process for a mobile computing device to prefetch application data for use by an application operating thereon during a period of disconnectivity from a communications network.
Figure 9B:
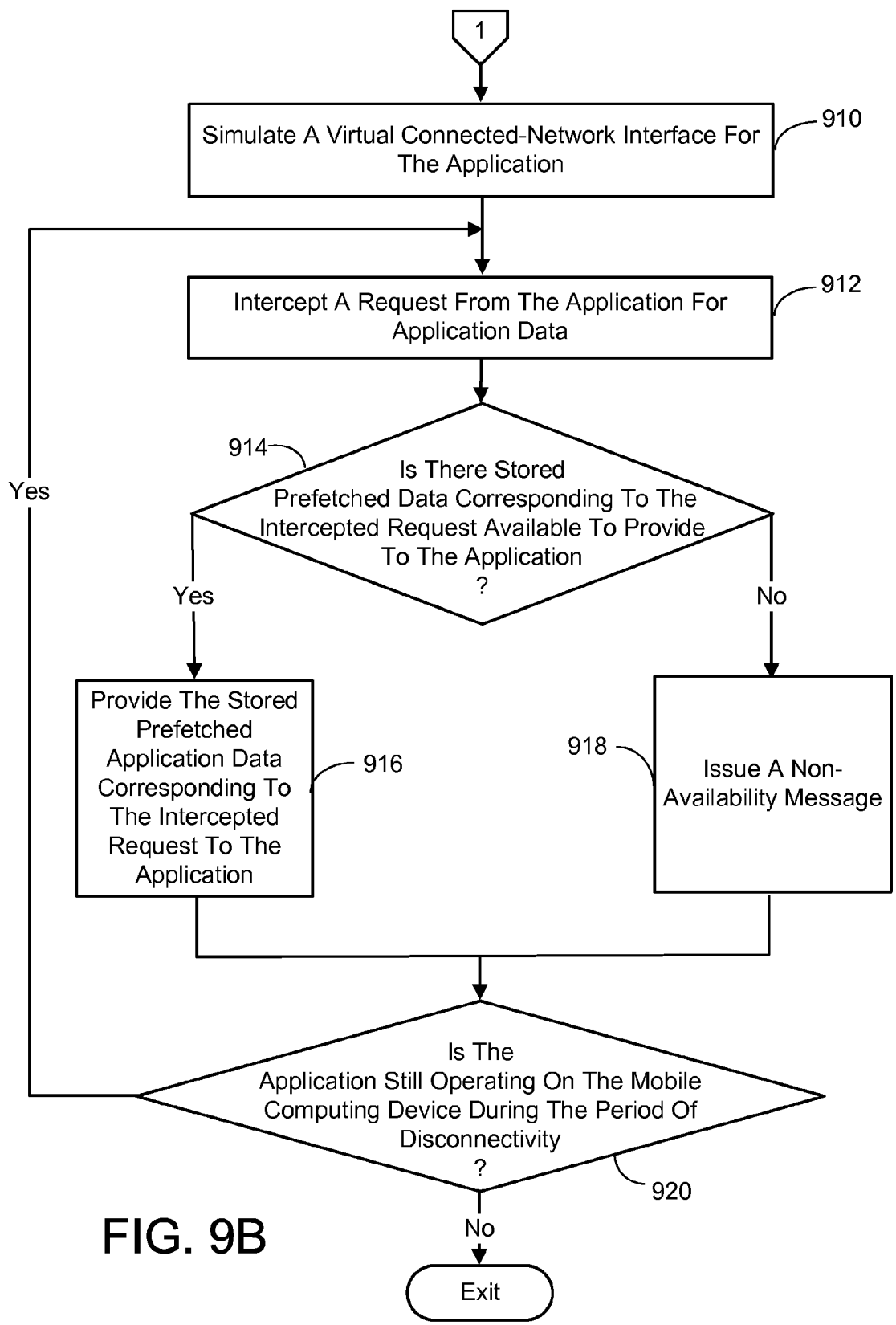

In view of the foregoing, FIGS. 9A-B provide an outline a general embodiment of a process for a mobile computing device to prefetch application data for use by an application operating thereon during a period of disconnectivity from a communications network. The process begins with application traffic data being collected and stored in the mobile computing device (process action 900). As described previously, the application traffic data includes at least one computer network addresses specifying a network site where application data relevant to the application can be obtained. The application traffic data is then analyzed to identify the application data that is to be prefetched to enable operation of the application during a period of disconnectivity from a communications network (process action 904). The identified application data is then prefetched and stored (process action 906). Next, it is determined if the application is operating on the mobile computing device during a period of disconnectivity (process action 908). If not, the mobile computing device continues monitoring for a period of disconnectivity. If, however, it is determined the application is operating on the mobile computing device during a period of disconnectivity, then a virtual connected-network interface is simulated for the application (process action 910). The virtual connected-network interface intercepts a request from the application for application data (process action 912). It is then determined if there is stored prefetched data corresponding to the intercepted request available to provide to the application (process action 914). If there is, the stored prefetched application data corresponding to the intercepted request is provided to the application (process action 916). If, however, prefetched application data corresponding to an intercepted request has not been stored, then the virtual connected-network interface issues a non-availability message (process action 918). It is next determined if the application is still operating on the mobile computing device during the period of disconnectivity (process action 920). If so, process actions 912 through 920 are repeated. Otherwise the process ends.

It is noted that the aforementioned standalone embodiment can also collect and use the previously-described environmental data. In such a case, the foregoing process is modified to include collecting and storing the environmental data (process action 902). As with the non-standalone embodiments, the environmental data can be predictive of when a period of disconnectivity will occur, and possibly how long the period might be. This predicitive information is used to facilitate scheduling of the application data prefetching (and the amount) so that it can occur prior to the predicted period of disconnectivity. In addition, the environmental data can be used to predict when and where the device will typically be found in a location where a period of connectivity is available to the mobile computing device. As described previously, this is particularly valuable if a period of Wi-Fi connectivity is anticipated. Often data can be downloaded to a mobile computing device via a Wi-Fi connection at a reduced cost or even for free. Thus, the cost of prefetching the application data can be reduced or eliminated.

It is further noted that while the foregoing description described employing a virtual connected-network interface to fake an network interface, intercept application requests and provide stored application data applicable to the request (if any), there is an alternate embodiment that can be used with some applications. In some applications, it is possible to store prefetched application data directly into the application's private cache. This works because these applications check for cached data before requesting additional application data It is additionally noted that developers of applications for mobile computing devices, or mobile application platforms, could allow their embedded URL content to be easily extractable. The URLs could also include advertisement content, which facilitates the generation of income even when users are offline by implementing a method to store advertisement access and prefetch advertisement-based application data.

Finally, it is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for pushing application data to a mobile computing device for use by an application operating on the mobile computing device during a period of disconnectivity from a communications network, comprising:

using one or more computing devices to perform the following process actions:

receiving application traffic data from the mobile computing device, said application traffic data comprising at least one computer network addresses specifying a network site where application data relevant to the application can be obtained;

analyzing the received application traffic data to identify the application data that is to be prefetched to enable operation of the application during a period of disconnectivity from a communications network;

receiving mobile computing device environment data from the mobile computing device, said mobile computing device environment data being predictive of at least when a period of disconnectivity will occur and how long the period will be;

scheduling prefetching of application data and providing of the at least some of the application data to the mobile computing device prior to the predicted period of disconnectivity, wherein the amount of application data provided is at least partially based on the predicted length of the period of disconnectivity;

prefetching the identified application data; and providing at least some of the prefetched application data to the mobile computing device at one or more scheduled times when the mobile computing device is connected to a communications network for storage by the mobile computing device.

2. The process of claim 1, wherein the process action of analyzing the received application traffic data to identify the relevant application data, comprises an action of identifying one or more computer network addresses each of which can be used to access a network site where relevant application data can be obtained.

3. The process of claim 2, wherein the process action of identifying one or more computer network addresses comprises an action of identifying one or more computer network addresses hardcoded in said application.

4. The process of claim 3, wherein the process action of identifying one or more computer network addresses further comprises an action of identifying one or more supplemental computer network addresses found in a network site or sites accessible using the identified hardcoded computer network addresses.

5. The process of claim 4, wherein the process action of identifying one or more computer network addresses further comprises an action of identifying one or more additional computer network addresses found in a network site or sites accessible using the identified supplemental computer network addresses.

6. The process of claim 2, wherein a computer network address can be in a modified form, said modified form being any form not directly used by the application to access a network site, and wherein the action of identifying one or more computer network addresses comprises an action translating each identified computer network address exhibiting a modified form into a useable form that can be used to access a network site.

7. The process of claim 1, further comprising the process actions of:
monitoring the computer network addresses being accessed by the same application operating on other computing devices;
identifying one or more popular computer network addresses being accessed by the same application operating on other computing devices with a frequency exceeding a prescribed threshold;
specifying that popular application data found on a network site or sites accessible via the identified popular computer network addresses is to be prefetched to enable operation of the application during a period of disconnectivity from a communications network; and
prefetching the identified popular application data.

8. The process of claim 1, wherein all the identified application data is to be prefetched.

9. The process of claim 1, wherein the process action of analyzing the received application traffic data to identify said relevant application data, comprises an action of identifying a plurality of computer network addresses, each of which can be used to access a network site where relevant application data can be obtained, and wherein the process action of prefetching the identified application data, comprises the actions of ranking the identified computer network addresses, and prefetching the identified application data from the identified computer network addresses in a highest to lowest rank order up to a prescribed download byte limit.

10. The process of claim 9, wherein the process action of ranking the identified computer network addresses, comprises the actions of:
determining the frequency each identified computer network address is accessed by the application; and
ranking the identified computer network addresses at least in part by the frequency they are accessed.

11. The process of claim 9, wherein the process action of ranking the identified computer network addresses, comprises the actions of:
determining an access pattern comprising a temporal order that the application accesses the identified computer network addresses; and
ranking the identified computer network addresses at least in part by said temporal order.

12. The process of claim 9, wherein the process action of ranking the identified computer network addresses, comprises the actions of:
determining a frequency of keywords associated with text and tags found in the identified computer network addresses, or associated with application data obtainable via the identified computer network addresses, or both; and
ranking the identified computer network addresses at least in part by the frequency of keywords associated therewith.

13. The process of claim 9, wherein the prescribed number of the highest ranking identified computer network addresses is determined based on at least one of (i) the remaining battery power available on the mobile computing device, said prescribed number being set higher in direct proportion to the amount of remaining battery power available; or (ii) a measure of the current performance of the communications network, said prescribed number being set higher in direct proportion to a higher measure of the current network performance; or (iii) an anticipated period of extended disconnectivity, said prescribed number being set higher whenever an extended period of disconnectivity is anticipated.

14. The process of claim 1, wherein the process action of providing at least some of the application data to the mobile computing device at one or more scheduled times when the mobile computing device is connected to a communications network for storage by the mobile computing device, comprises an action of pre-staging the prefetched data at a site that the mobile communication device has access to via a communications network.

15. The process of claim 14, wherein the process action of analyzing the received application traffic data to identify said relevant application data, comprises an action of identifying a plurality of computer network addresses, each of which can be used to access a network site where relevant application data can be obtained, and wherein the process action of prefetching the identified application data, comprises the actions of ranking the identified computer network addresses and prefetching the identified application data from the identified computer network addresses in a highest to lowest rank order up to a prescribed download byte limit, and wherein the process action of pre-staging the prefetched data at a site that the mobile communication device has access to via a communications network, comprises the actions of packaging the prefetched application data in one or more files and pre-staging said file at a site that the mobile communication device has access to via a communications network.

16. The process of claim 1, wherein said mobile computing device environment data is further predictive of when a period of Wi-Fi connectivity will occur, and wherein said process action of providing at least some of the prefetched application data to the mobile computing device at one or more scheduled times when the mobile computing device is connected to a communications network for storage by the mobile computing device, comprises providing at least some of the prefetched application data during a predicted period of Wi-Fi connectivity, so as to reduce a cost to a user of the mobile computing device for receiving the application data.

\* \* \* \* \*